May 6, 1930.　　F. G. CLARK ET AL　　1,757,235
ELECTROLYTIC APPARATUS
Original Filed April 7, 1921　　2 Sheets-Sheet 2
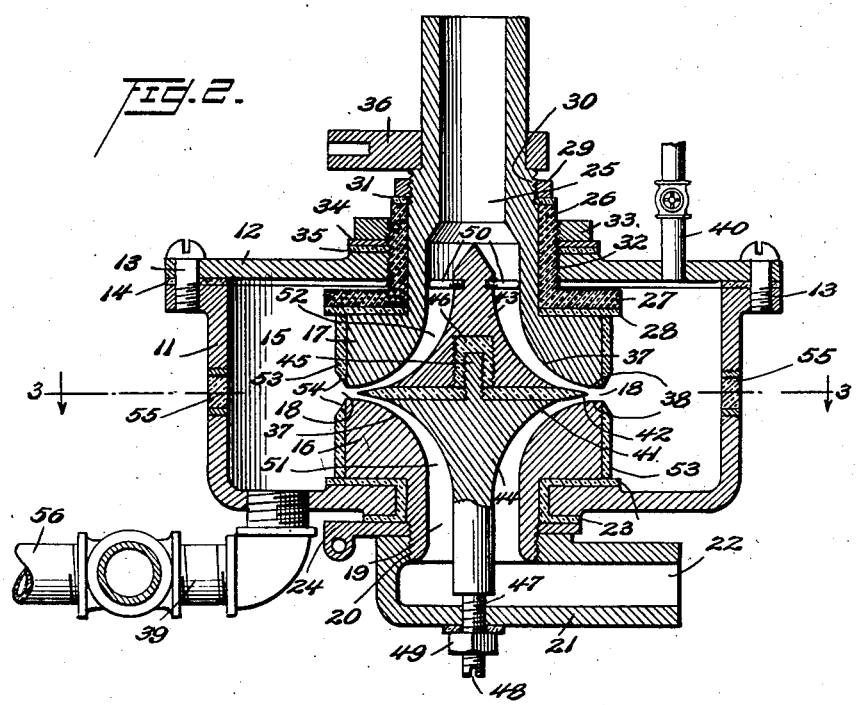
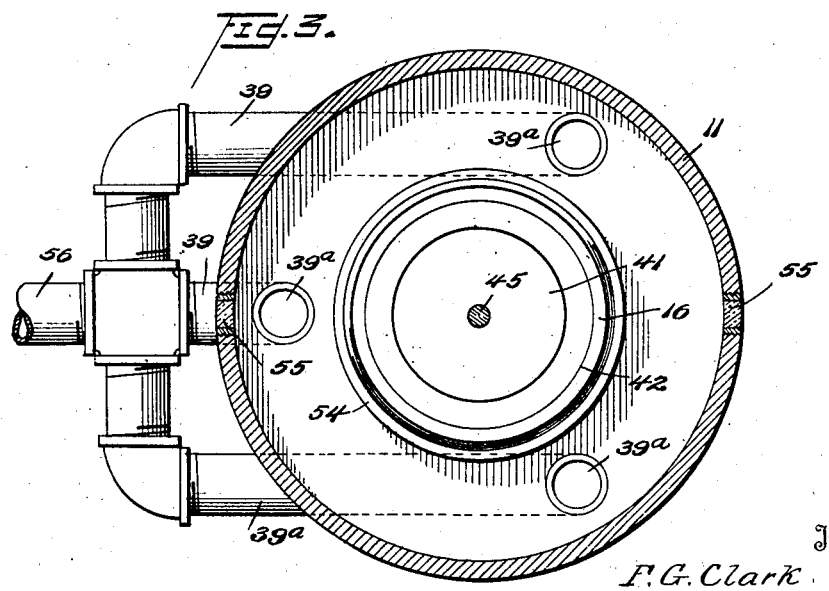
Inventors
F. G. Clark
J. N. Smith
By
Their Attorney Patented May 6, 1930

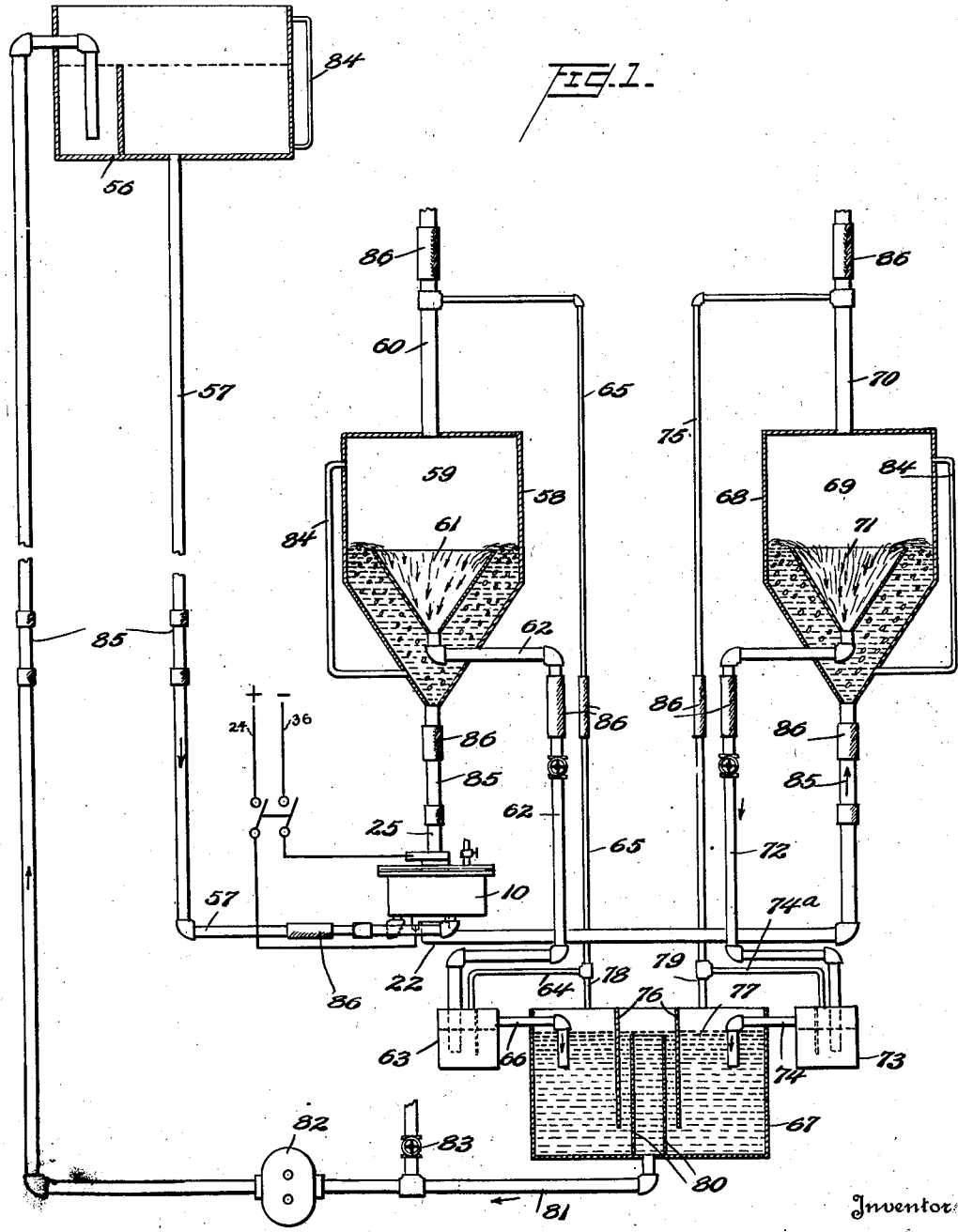

1,757,235

UNITED STATES PATENT OFFICE

FARLEY GRANGER CLARK AND JAMES NORMAN SMITH, OF TORONTO, ONTARIO, CANADA, ASSIGNORS, BY MESNE ASSIGNMENTS, TO FARLEY G. CLARK

ELECTROLYTIC APPARATUS

Application filed April 7, 1921, Serial No. 459,292. Renewed February 8, 1927.

This invention relates to electrolytic apparatus; and it has to do more particularly with electrolytic apparatus whereby the electrolyzing operation can be effected at relatively high current densities, most desirably without the interposition of a separating diaphragm between the active electrode surfaces.

While the apparatus of the invention finds its chief utility at the present time in the electrolytic production of oxygen and hydrogen from water, it is capable of being employed for other purposes. For the sake of a concrete example, however, a typical apparatus adapted more particularly for the electrolytic production of oxygen and hydrogen will be hereinafter described in detail in conjunction with the accompanying drawings, in which Fig. 1 is a more or less diagrammatic representation of a complete system embodying the invention, the view being in side elevation, partly in vertical section;

Fig. 2 is a central vertical section of the generator or cell unit employed, on an enlarged scale; and Fig. 3 is a horizontal section on the line 3—3 of Fig. 2.

Referring to the drawings, 10 represents generally a cell or generator of the novel type here in question. This generator comprises a casing consisting of a receptacle 11, having a cover 12 securely fastened thereto by any suitable means such as machine screws 13, a packing gasket 14 being provided to ensure a liquid-tight joint. Within the chamber 15 enclosed by the generator casing, are mounted the electrodes 16 and 17, 16 being the anode and 17 being the cathode. The electrodes may be of any suitable material having the requisite degree of conductivity and resistance to action of the electrolyte; and they may be of any shape and construction suitable to provide a relatively narrow slot-like passage for flow of electrolyte therebetween. With an aqueous solution of a caustic alkali, iron or nickel or nickel-plated electrodes are suitable; or the anode may be made of or plated with nickel and the cathode of iron. In the particular embodiment of the invention here chosen to illustrate the broad principles involved, the electrodes are hollow cylindrical members, interiorly bell-shaped and coaxially positioned with the edges of the bells closely adjacent to form an annular gap or slot-like passage for electrolyte flow, as indicated at 18. The general form of the two electrodes may be similar, as in the present example. Thus the hollow interior of the anode contracts inwardly from the slot 18 to form a conduit or pipe 19 which extends through a suitable aperture in the casing bottom and which is externally threaded at 20 for connection to a pipe fitting 21 which provides a lateral extension 22 of the conduit 19. By means of this arrangement, the anode 16, extending through the bottom of the chamber 11, and externally shouldered, as shown, may be firmly clamped in position, suitable packing and insulating material 23 being provided to ensure a liquid-tight joint and to insulate the anode electrically from the generator casing. A ring terminal 24 surrounds and engages the anode for connecting the same to a suitable current supply. Said terminal may be clamped between the fitting 21 and the insulating gasket 23.

Similarly, the hollow interior of the cathode 17 contracts inwardly to form the pipe or conduit 25 extending through a suitable aperture provided in the cover 12. The pipe or stem portion 25 of the cathode is surrounded by a heavy bushing 26 of insulating material such as hard rubber, for example, which electrically insulates the cathode from the generator casing. Said bushing 26 has a flange 27 bearing against the shouldered exterior of the cathode either directly or through an interposed packing gasket 28. Said bushing is held in position on the cathode with its flange 27 pressed tightly against the gasket 28, by means of a nut 29 working on the exteriorly threaded portion 30 of pipe 25 and adapted to be turned down solid against the upper edge of the bushing 26 through an interposed packing gasket 31. The assembled bushing and cathode are securely held in position in the cover 12 in any suitable manner, but it is desirable to have the assemblage mounted in such manner as to be adjustable axially toward and away from the opposite electrode. To this end the bushing 26 is externally threaded as indicated at 32 to engage the correspondingly threaded aperture in the cover 12; and the assemblage may be securely held in any adjusted position by means of the lock nut 33, which bears against washer 34 and packing gasket 35, both interposed between said lock nut and the cover 12. A terminal 36 is provided for connecting the cathode to the negative side of the current supply source.

It will be seen that the inner walls of the electrodes curve gently inwardly away from the slot 18 and into parallelism with the generator axis, to form the conduits 19 and 25, which extend in opposite directions from and at right angles to the plane of said slot 18. The inner portion of each electrode in the present construction is in fact a convex curved surface of revolution symmetrical about the central longitudinal axis of the apparatus, and the portion of the surface generatrix indicated at 37 may approximate a circular arc. For a short distance inwardly toward the axis from the extreme outer edges at 18, the adjacent inner surface of the electrodes are desirably substantially parallel and plane as indicated at 38, thus providing a narrow annular zone within which the electrode surfaces are substantially parallel. Inwardly beyond this narrow zone, the adjacent electrode surfaces curve away from each other; and consequently, when proper voltage is applied to the electrodes, the current path between the electrodes is confined almost wholly to the comparatively narrow annular zone 38 adjacent their outer edges.

In the ordinary use of the particular apparatus here described, the electrolyte, say a solution of caustic soda or caustic potash in water, is supplied to the generator chamber 15 through one or more conduits 39 entering the same through apertures 39ª. The electrolyte is most desirably supplied under pressure and the chamber 15 is maintained full at all times, a valved vent or blow-off pipe 40 being provided to permit escape of air or other gas from the upper part of the chamber when starting. The electrolyte flows at high velocity through the slot 18 between the cooperating electrodes and is subjected in passing across the narrow annular zone 38 to the electrolyzing action of the current. Where separation of the products of electrolysis is essential, as in the manufacture of oxygen and hydrogen, the inflowing sheet or layer of electrolyte should be divided or split into two parts immediately after it has passed through the slot 18 and across the electrolyzing zone. One practical form of means for this purpose is here shown as comprising a separator disc 41, whose thin peripheral edge 42 is presented to the inflowing body of electrolyte at a locality closely adjacent the inner edge of the electrolyzing zone 38 and approximately midway between the adjacent electrode surfaces. This separator member may be supported in position in any suitable manner. Most desirably it should be so supported that it can be adjusted vertically for attainment of the optimum position to effect proper separation of the inflowing electrolyte into anolyte and catholyte portions. Owing to the fact that the volume of hydrogen generated is twice that of the oxygen the proper position of the separator disk edge may be somewhat nearer the anode in some cases. In the present instance the separator disc is held between an upper member 43 and lower member 44 to be described in greater detail presently. The lower member 44 is provided with a threaded stem 45 which extends through a central aperture in the disc 41 for threaded connection to the upper member 43. Where the members 43 and 44 are of metal, as in the present instance, it is desirable to electrically insulate them from each other; and to this end the disc 41 is here shown as made of insulating material, while the threaded connection between member 43 and the stem 45 is effected by means of an internally and externally threaded insulating nut or bushing 46. The complete separator structure 41, 43, 44, is supported with its central vertical axis coincident with the central vertical axis of the cooperating electrodes. In this instance, the lower separator member 44 has a threaded stem 47 extending through the lower wall of the fitting 21; and by means of a suitable tool engaging the kerf 48 at the end of the stem, the position of the entire separator structure may be adjusted vertically as desired and locked in adjusted position by means of a lock nut 49. The upper member 43 is desirably provided with radially extending pins 50 to accurately center the upper portion of the separator structure in the central axis of the conduit 25. The best position of the separator edge 42 with respect to the cooperating electrode surfaces, for effecting separation of anolyte from catholyte depends upon various factors such as velocity of electrolyte flow, width of gap transverse to electrolyte flow, or the like; but may be determined in any given instance from an examination of the hydrogen and oxygen recovered.

The outer surfaces of the members 43 and 44 are concave surfaces of revolution, the generatrix of each being of such form that each surface merges smoothly into the surface of the sharp edged separator disc 41 and diverges slightly from the adjacent curved surface 37 of the cooperating electrode member as the separator member surface curves inwardly toward the central axis. By virtue of this arrangement, the annular passages 51 and 52 thus formed for anolyte and catholyte, respectively, flare or expand smoothly in a direction inwardly from the electrolyzing zone 38, whereby the velocity of the electrolyte is considerably reduced below the velocity maintained in the electrolyzing zone. This, and the subsequent further enlargement of the anolyte and catholyte conduits, is advantageous in that it brings about a relatively quiescent condition of the anolyte and catholyte which favors separation of the oxygen and hydrogen, respectively, therefrom.

As here shown, the exterior surfaces of the electrodes are covered with insulating material 53, which is most desirably beveled or otherwise formed at the edges of the electrodes to provide a converging approach 54 for the electrolyte to the slot 18. The side walls of the generator casing may also be provided with observation windows 55 whereby the conditions within the generator may be observed.

The process carried out in the cell or generator 10, above described, is not claimed herein, but is the subject matter of a copending application of Farley G. Clark, filed on even date herewith, Serial Number 459,291.

The generator 10 described above in detail may be employed with additional apparatus of any suitable character to form a complete system for the continuous and methodical handling of the electrolyte and evolved gases. Such a system is illustrated in Fig. 1 by way of example. In this instance, the supply of electrolyte under pressure is afforded by a supply tank 56 located at a sufficient elevation to provide the pressure necessary to force the electrolyte between the active electrode surfaces at the desired velocity. Said tank may be provided with any well known or suitable means (not shown) for maintaining the electrolyte level therein constant. The tank is connected to the inlet or inlets of the generator casing by the pipe 57, as shown. Hydrogen and catholyte leaving the outlet 25 of the hollow circular cathode are conducted into the lower part of a large hopper-bottomed tank 58 where the velocity of flow is greatly reduced and the hydrogen has ample opportunity to separate from the catholyte. Hydrogen thus separated collects in the gas space 59 and is conducted thence through outlet pipe 60 to a gasometer (not shown) or other convenient place of storage or use. Catholyte substantially free of hydrogen overflows the upper edge of a funnel-shaped intake 61 which is disposed coaxially within the hopper-bottomed separating tank 58 and serves to baffle the discharge from generator outlet 25, said catholyte passing from the intake through pipe 62, down into a secondary gas and electrolyte separator 63, any hydrogen separated here being led by way of pipes 64 and 65 into the main hydrogen outlet pipe 60, while gas-free catholyte flows over through pipe 66 into a collecting and return tank 67.

Similarly, anolyte and oxygen leaving the generator through outlet 22 from the anode, are conducted into the lower end of a hopper-bottomed tank 68, in which the oxygen separates from the anolyte, and which may be similar in all essential respects to the tank 58 before described. Oxygen collecting in the gas space 69 is led away through outlet 70 to another gasometer (not shown) or any other suitable place of storage and use. Anolyte, substantially free of oxygen, overflows the upper edge of the combined intake and baffle 71, flowing from the bottom thereof through pipe 72 and thence down into the secondary anolyte and oxygen separator 73, gas-free anolyte finally passing over through pipe 74 into the tank 67, while any oxygen separated in tank 73 passes by way of pipes 74ᵃ and 75 into the main oxygen outlet pipe 70.

The return tank 67 is closed and is provided with baffle walls 76 which depend from the cover thereof and extend well below the normal level 77 of electrolyte therein. Separate collecting spaces are thus provided for any hydrogen and oxygen that may still by any chance be retained by the catholyte and anolyte, any such residual hydrogen and oxygen being led by way of pipe connections 78 and 79 into pipes 65 and 75, respectively. Separated catholyte and anolyte, after passing down under the lower edges of baffles 76 and then over the upper edges of a secondary pair of baffles 80 arranged therebetween, commingle and pass down through supply pipe 81 to the inlet of a suitable pump 82 which elevates the electrolyte to the pressure tank 56 before mentioned. Provision may be made for automatically regulating the speed of the pump in such a way as always to maintain the proper supply of electrolyte in the supply tank. Make-up water may be introduced at any suitable point in the system, as at 83, to replenish the supply used up in the electrolysis.

The provision of the secondary separating tanks 63 and 73 is optional, and they may usually be dispensed with when operating within the lower part of the range of current densities herein contemplated. Moreover, centrifugal gas separators may be employed instead of those illustrated. Provision may be made in connection with tanks 56 and 67 for automatically cutting off the current supply to the generator in case of abnormal conditions in electrolyte level in either of said tanks. Gage glasses 84 may be provided on the various tanks as indicated. The piping in the electrolyte circulating system may include sight glasses 85 wherever these are convenient or necessary for proper observation of the flow of electrolyte. The piping also most desirably includes insulating sections or joints 86 at the points indicated, to aid in preventing grounding of the system.

The impelling pressure on the electrolyte required to force its flow across the electrolyzing zone at a sufficiently high velocity is determined by practical operating conditions, the most important factor being the distance between the active electrode surfaces. Where these surfaces are only one one-hundredth of an inch apart, for example, a considerably higher pressure head on the electrolyte is required than where they are one-tenth of an inch or more apart. Ordinarily it is not desirable that the electrode surfaces be more than a quarter of an inch apart. In any case, it is ordinarily desirable that the difference in pressure on opposite sides of the electrolyzing zone shall be at least one pound or more in order to ensure sufficiently rapid flow of electrolyte through said zone.

It will be noted that in the apparatus here chosen for purposes of illustration, the active electrode surfaces are in horizontal planes, with the cathode uppermost, advantage being thus taken of the extreme lightness and buoyancy of hydrogen to assist in removing it from the vicinity of the anode and thereby further to guard against diffusion of hydrogen into the oxygen. This or any other arrangement of the electrodes that utilizes the greater buoyancy of the hydrogen for the purposes described, thus facilitates the production of especially pure oxygen. It is to be understood, however, that within the broad scope of the invention, this particular arrangement of electrodes is not essential, and that the positions of anode and cathode may be reversed, or that the electrodes may be disposed with their active surfaces in vertical or other planes, as may be desirable in any given instance. Moreover, in its broader aspects, the invention is not restricted to the employment of annular electrodes.

While a typical practical form of apparatus has been described in detail for the sake of a concrete example in explaining the underlying principles of the invention, it is to be understood that the broad invention may be embodied in many other forms differing in structural detail from that here illustrated while realizing all or a substantial part of the advantages attained by the invention.

The term "annular" as employed in the appended claims is to be understood in a broad sense, unless otherwise indicated, to signify not only circular annuli, but also other curved annuli, polygonal annuli, or the like.

What we claim is:

1. Electrolytic apparatus for the production of oxygen and hydrogen from an aqueous solution comprising a pair of electrode devices, constituting a couple and having cooperating annular surfaces which are operatively adjacent but spaced apart to provide an annular electrolyzing zone, said devices including conduit means extending away from said annular surfaces, and means for adjusting the distance between said annular surfaces, said surfaces being symmetrical to one another with respect to said zone to provide radial flow of the solution toward the axis of the surfaces.

2. Electrolytic apparatus comprising the combination, with a pair of tubular electrode devices constituting a couple and having cooperating annular faces operatively spaced apart to provide an annular electrolyzing zone, of means for flowing electrolyte across said zone between said faces, and means adjacent said zone for dividing electrolyte leaving said zone into separate portions, said devices and surfaces being symmetrical to one another with respect to said electrolyzing zone to provide radial flow of the electrolyte toward the axis of the devices.

3. Electrolytic apparatus comprising the combination, with a pair of tubular electrode devices constituting a couple and having cooperating annular faces operatively spaced apart to provide an annular electrolyzing zone, of means for flowing electrolyte across said zone between said faces, and means adjacent said zone for dividing electrolyte leaving said zone into separate portions, the position of such dividing means relative to said passage being adjustable.

4. Electrolytic apparatus comprising the combination, with a pair of electrodes constituting a couple and having opposed active surfaces spaced apart to provide an unobstructed passage for a continuous flow of electrolyte therebetween, of means adjacent said passage for dividing into separate parts electrolyte leaving said passage, said devices and surfaces being symmetrical to one another with respect to said passage to provide respective symmetry in directions of electrolyte flow across the passage and at said dividing means.

5. Electrolytic apparatus comprising the combination, with a pair of electrodes constituting a couple and having opposed active surfaces in closely adjacent spaced relation to provide a narrow and unobstructed slot-like passage for a continuous and relatively high velocity flow of electrolyte therebetween, of separator means having a relatively thin dividing edge located adjacent said slot-like passage for dividing into separate parts electrolyte leaving said passage, said electrodes and surfaces being symmetrical to one another with respect to said passage to provide respective symmetry in directions of electrolyte flow across the passage and at said dividing edge.

6. Electrolytic apparatus comprising the combination, with hollow electrode members forming a couple and having opposed annular active surfaces which are in operatively adjacent spaced relation, of a separator device disposed in the space within said electrodes and having a dividing edge lying adjacent the annular passage or slot formed between said active surfaces, a casing surrounding said electrodes, and piping connections to said casing and to the interior of said electrodes.

7. Electrolytic apparatus comprising the combination, with hollow electrode members forming a couple and having opposed annular active surfaces which are in operatively adjacent spaced relation, a separator device disposed in the space within said electrodes and having a dividing edge lying adjacent the annular passage or slot formed between said active surfaces, a casing surrounding said electrodes, and piping connections to said casing and to the interior of said electrodes, said separator device having tapered portions which form with the inner walls of said electrodes conduits which enlarge in a direction away from said annular passage.

8. Electrolytic apparatus comprising the combination, with a casing, of cooperating hollow anode and cathode devices mounted therein, each said device including an annular electrode surface and a conduit leading away therefrom to the exterior of said casing, the cooperating annular electrode surfaces being in closely adjacent spaced relation and forming an annular slot which is narrow both transversely and in the direction of current flow, separator means disposed within the space enclosed by said anode and cathode devices and presenting a dividing edge adjacent said annular slot, means for supplying electrolyte under pressure to said casing, and means for separately treating anolyte and catholyte discharged from the conduits of the anode device and cathode device, respectively, for recovery of electrolytic products.

9. Electrolytic apparatus comprising the combination, with a casing, of tubular anode and cathode devices coaxially mounted therein, said devices being relatively adjustable axially and the inner walls of each device flaring outwardly radially into an annular lip or rim which provides an active electrode surface adapted to cooperate with the corresponding closely adjacent lip or rim of the other device, whereby a constricted slot-like passage of adjustable width axially and of relatively small transverse width is provided, said passage affording communication between said casing and the interior of said anode and cathode devices, an axially adjustable separator device having a dividing edge extending intermediate the outwardly flaring walls of said devices to adjacent said passage, said separator device also comprising tapered portions extending oppositely from said dividing edge and forming with the inner walls of said anode and cathode devices conduits that enlarge as they recede from said passage, means for supplying electrolyte under pressure to said casing, means for treating separately anolyte and catholyte discharged from said anode and cathode for separation of electrolytic products, and means for returning residual electrolyte to said casing.

10. Electrolytic apparatus for generating oxygen and hydrogen which comprises hollow anode and cathode devices having annular active electrode surfaces, said devices being operatively assembled with said annular surfaces registering in closely adjacent spaced relation and with the cathode device uppermost, means for passing electrolyte inwardly between said annular surfaces, means disposed within the electrode assemblage for dividing electrolyte so passed into anolyte and catholyte portions, and separately conducting such portions from the interior of the anode and cathode respectively.

11. Electrolytic apparatus for producing oxygen and hydrogen comprising, in combination, a cell comprising an electrode couple having cooperating active electrode surfaces separated by an unobstructed space, a supply of aqueous electrolyte, means for conducting electrolyte from said supply under pressure to said cell and forcing said electrolyte between and across said electrode surfaces, means for dividing the effluent electrolyte into anolyte and catholyte portions, independent separators for freeing the anolyte and catholyte from oxygen and hydrogen, respectively, and means for returning separated electrolyte from said separators to said supply.

12. Electrolytic apparatus comprising the combination, with hollow electrode members forming a couple and having opposed annular active surfaces in operatively adjacent spaced relation, of a separator device having a dividing edge presented adjacent the annular slot-like passage formed between said active surfaces, and means for directing flow of electrolyte through said passage toward said dividing edge.

13. Electrolytic apparatus for the decomposition of water comprising the combination, with an annular anode and an annular cathode mounted in spaced relation to a horizontally disposed annular slot-like passage between them, of means for directing flow of electrolyte through said passage.

14. Electrolytic apparatus for the decomposition of water comprising a casing in combination with a tubular anode and a tubular cathode supported therein with cooperating active surfaces symmetrically disposed within one-tenth of an inch of each other, said surfaces being in axial alignment, and means positioned between said anode and cathode for separating and conducting the products of electrolysis away from said active surfaces.

15. An electrolytic cell for the decomposition of water comprising cooperating annular anode and annular cathode active surfaces symmetrically disposed within one-tenth of an inch of each other, said surfaces being in axial alinement, and means positioned between said anode and cathode for separating and conducting the products of electrolysis away from said active surfaces.

16. An electrolytic cell for the decomposition of water comprising cooperating annular anode and annular cathode active surfaces symmetrically disposed within substantially less than one-tenth of an inch of each other, said surfaces being in axial alinement, and means positioned between said anode and cathode for separating and conducting the products of electrolysis away from said active surfaces.

17. Electrolytic apparatus for the decomposition of water comprising, in combination, a cell, means for supplying electrolyte thereto, an anode and a cathode cooperating therewith, said cathode having its active electrode surface disposed at a higher level than the active electrode surface of said anode, and means for conducting cathodic products substantially free from anodic products upwardly away from said cathode.

18. In electrolytic apparatus, an electrolytic cell adapted to produce anodic and cathodic gases from an electrolyte, an inlet conduit to said cell for delivery of the electrolyte thereto, an outlet conduit from said cell for delivery of commingled gases and electrolyte, a main separating tank for said electrolyte and gases communicating with said outlet conduit, an auxiliary or secondary separating tank communicating with said main separating tank, conduit means adapted to deliver gases from said tanks, an electrolyte return tank communicating with said auxiliary separating tank, and means for delivering electrolyte from said return tank to said cell through said inlet conduit under pressure.

19. Electrolytic apparatus for the decomposition of water comprising, in combination, an electrolyte chamber, and a pair of apertured electrodes within said chamber in axial alinement and formed with curving inner surfaces extending inwardly and in opposite directions away from the outer active surfaces thereof affording communication between the interior and exterior of the chamber for the passage of outflowing electrolyte together with the products of electrolytic decomposition, and a separator positioned between the said inner surfaces of the electrodes and providing therewith separate conduits for the products of electrolysis.

20. Electrolytic apparatus, comprising a pair of tubular electrodes arranged in axial alinement and each having an annular electrode face, said electrodes and faces being disposed symmetrically to one another, and means positioned between said electrodes for separating and forming separate conduits for the produces of electrolysis.

21. Electrolytic apparatus, copmrising a tubular anode element and a tubular cathode element, said elements being in axial alinement and spaced apart, the adjacent edges of the elements being in close proximity, the said edges forming annular electrode active surfaces, the space between the said surfaces being unobstructed, and means positioned between said anode and cathode for separating and conducting the products of electrolysis away from said active surfaces.

22. Electrolytic apparatus, comprising a tubular anode element and a tubular cathode element, said elements being spaced apart and having bell shaped inner surfaces in axial alinement, the outer ends of said surfaces being in close proximity and forming annular electrode surfaces, the space between these outer ends being unobstructed.

23. Electrolytic apparatus, comprising a pair of tubular electrode elements arranged in symmetrical relation to one another and in axial alinement and each having an annular electrode face, and means for adjusting the elements axially toward and away from each other.

24. Electrolytic apparatus, comprising a tubular anode element and a tubular cathode element, said elements being spaced apart and having bell shaped inner surfaces in axial alinement, the outer ends of said surfaces being in close proximity and forming annular electrode surfaces, the space between these outer ends being unobstructed, and means for adjusting the elements axially toward and away from each other.

25. Electrolytic apparatus, comprising a pair of axially alined hollow cylindrical electrodes interiorly bell-shaped with the outer edges of the bell-shaped portions closely adjacent, forming an annular gap or slot-like passage for the electrolyte flow, and a separator positioned therebetween with its outer edge adjacent said passage and forming with said electrodes separate conduits for the products of electrolysis.

26. Electrolytic apparatus, comprising a pair of electrodes positioned in axial alinement and having their adjacent outer portions of their inner surfaces in substantially parallel adjacent planes, providing a narrow annular zone within which the electrode surfaces are substantially parallel, the electrode surfaces curving convexedly inwardly and away from each other from the said adjacent narrow portions thereof, each of said curving electrode surfaces curving toward a common axis and forming a conduit extending substantially at right angles to said first named parallel adjacent portions, and a separator positioned therebetween for separating and directing the products of electrolysis away from said narrow annular zone and into said conduits.

In testimony whereof we hereunto affix our signatures.

FARLEY GRANGER CLARK.
JAMES NORMAN SMITH.